United States Patent
Dai et al.

(10) Patent No.: US 10,401,917 B1
(45) Date of Patent: Sep. 3, 2019

(54) MULTI-LINKAGE HINGE AND ELECTRONIC DEVICE HAVING THE SAME

(71) Applicant: FOSITEK CORPORATION, New Taipei (TW)

(72) Inventors: Way-Han Dai, New Taipei (TW); Chun-Han Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/228,366

(22) Filed: Dec. 20, 2018

(30) Foreign Application Priority Data

Sep. 6, 2018 (TW) .............................. 107131344 A

(51) Int. Cl.
| | | |
|---|---|---|
| *G06F 1/16* | (2006.01) | |
| *E05D 7/00* | (2006.01) | |
| *E05D 11/08* | (2006.01) | |
| *H04M 1/02* | (2006.01) | |

(52) U.S. Cl.
CPC ............. *G06F 1/1681* (2013.01); *E05D 7/00* (2013.01); *E05D 11/087* (2013.01); *G06F 1/1616* (2013.01); *G06F 1/1652* (2013.01); *E05Y 2900/606* (2013.01); *H04M 1/0268* (2013.01)

(58) Field of Classification Search
CPC ..................................................... G06F 1/1681
See application file for complete search history.

(56) References Cited

U.S. PATENT DOCUMENTS

| | | | | | |
|---|---|---|---|---|---|
| 5,570,971 | A | * | 11/1996 | Rixen | .................... E04B 2/7427 403/381 |
| 8,720,011 | B1 | * | 5/2014 | Hsu | .......................... E05D 3/122 16/354 |
| 9,243,432 | B2 | * | 1/2016 | Lee | ............................. E05D 3/06 |
| 9,684,343 | B2 | * | 6/2017 | Tazbaz | .................. G06F 1/1637 |
| 9,719,280 | B2 | * | 8/2017 | Tian | ...................... H05K 5/0226 |
| 10,036,189 | B2 | * | 7/2018 | Chen | .......................... E05D 3/14 |
| 10,244,653 | B2 | * | 3/2019 | Hsu | ........................... E05D 3/06 |
| 2014/0174226 | A1 | * | 6/2014 | Hsu | .......................... E05D 3/122 74/98 |
| 2014/0174227 | A1 | * | 6/2014 | Hsu | ........................... E05D 3/14 74/98 |
| 2016/0090763 | A1 | * | 3/2016 | Hsu | ........................... E05D 3/06 16/354 |

* cited by examiner

*Primary Examiner* — Adrian S Wilson

(74) *Attorney, Agent, or Firm* — Womble Bond Dickinson (US) LLP

(57) ABSTRACT

A multi-linkage hinge includes a base bar, two friction bars, two synchronous rotation bars and two torsion plates. The base bar extends longitudinally to have two connecting ends and two middle pivot portions . Each friction bar has two link ends respectively coupled to the connecting end of the base bar and a middle portion of the respective torsion plate. The synchronous rotation bars are interposed between the friction bars, and each has two pivot ends respectively coupled to the middle pivot portion of the base bar and a driven end of the respective torsion plate. The torsion plates are turnable synchronously relative to the base bar between unfolded and folded positions. In the unfolded position, a bending space is formed between the torsion plates for receiving a bending portion of the display sheet.

15 Claims, 10 Drawing Sheets

MULTI-LINKAGE HINGE AND ELECTRONIC DEVICE HAVING THE SAME

CROSS-REFERENCE TO RELATED APPLICATION

This application claims priority of Taiwanese Patent Application No. 107131344, filed on Sep. 6, 2018.

FIELD

The disclosure relates to a hinge for a foldable electronic device, and more particularly to a multi-linkage hinge and an electronic device having the same.

BACKGROUND

Consuming electronic products are integral to people's lives, such as a smart phone and a panel computer, which are used to handle the daily works and provide end users information. Larger display dimensions of a smart phone or a panel computer are developed to present information with more readable fonts and images. However, a large display reduces portability. Recently, a flexible display is applied to a mobile phone to provide a large screen size and to be also convenient for handling. However, there are problems with the display hinge of such flexible phone.

SUMMARY

Therefore, an object of the disclosure is to provide a multi-linkage hinge which can allow two casing halves of an electronic device to be opened and closed relative to each other and provide a bending space for receiving a bending portion of a flexible display sheet.

In addition to the above-mentioned object, an object of the disclosure is to provide an electronic device having the multi-linkage hinge.

According to the disclosure, the multi-linkage hinge includes at least one linkage assembly. The linkage assembly includes a base bar, two friction bars, two synchronous rotation bars and two torsion plates. The base bar has a crossbar which extends in a longitudinal direction to terminate at two connecting ends and which has two middle pivot portions that are disposed between the connecting ends. Each of the friction bars has a first link end which is coupled to a respective one of the connecting ends, and a second link end opposite to the first link end. The synchronous rotation bars are interposed between the friction bars. Each of the synchronous rotation bars has a first pivot end which is coupled to a respective one of the middle pivot portions, and a second pivot end opposite to the first pivot end. The first pivot ends of the synchronous rotation bars mesh with each other so as to allow synchronous rotations of the second pivot ends in opposite directions. Each of the torsion plates has a driven end which is coupled to the second pivot end of a respective one of the synchronous rotation bars, and a middle portion which is coupled to the second link end of a respective one of the friction bars. The torsion plates are synchronously turnable relative to the base bar, through a torque generated as a result of the synchronous rotations of the second pivot ends and linking of the second link end to the middle portion, between an unfolded position, where the driven ends are close to each other, and a folded position, where the driven ends are remote from each other to form a bending space between the torsion plates. The torsion plates are configured to be respectively interfered with the friction bars with a friction force that keeps the torsion plates to a predetermined angular position during the synchronous turning of the torsion plates.

According to the disclosure, the electronic device includes a plurality of multi-linkage hinges as described above, two casing halves and a flexible display sheet. Each of the multi-linkage hinges further includes two coupling brackets, each of which is connected to a respective one of the torsion plates of the at least one linkage assembly. The casing halves are respectively connected with the coupling brackets such that the casing halves are coupled to each other via the multi-linkage hinges to be opened and closed relative to each other. The flexible display sheet is attached to and covers the casing halves and the multi-linkage hinges. The flexible display sheet is bent when the torsion plates are in the folded position, where a bending portion of the flexible display sheet is received in the bending spaces. Thus, damage to the flexible display sheet when folded is avoided.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
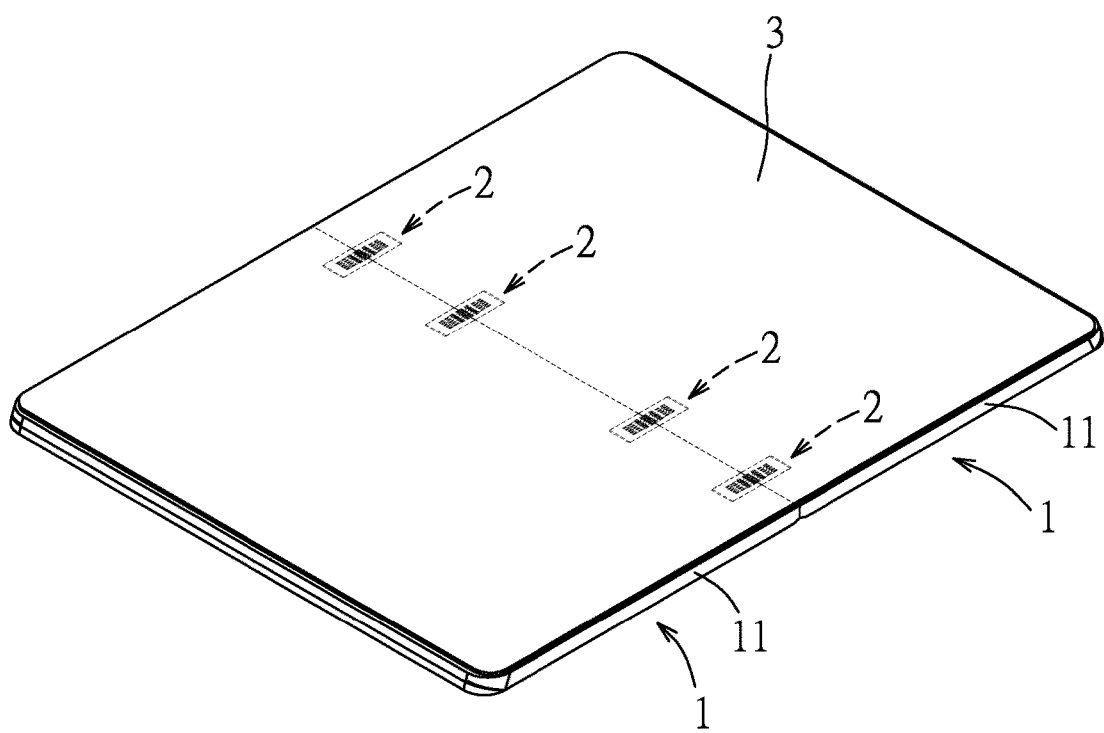
FIG. 1 is a perspective view illustrating an embodiment of an electronic device according to the disclosure.
Figure 2:
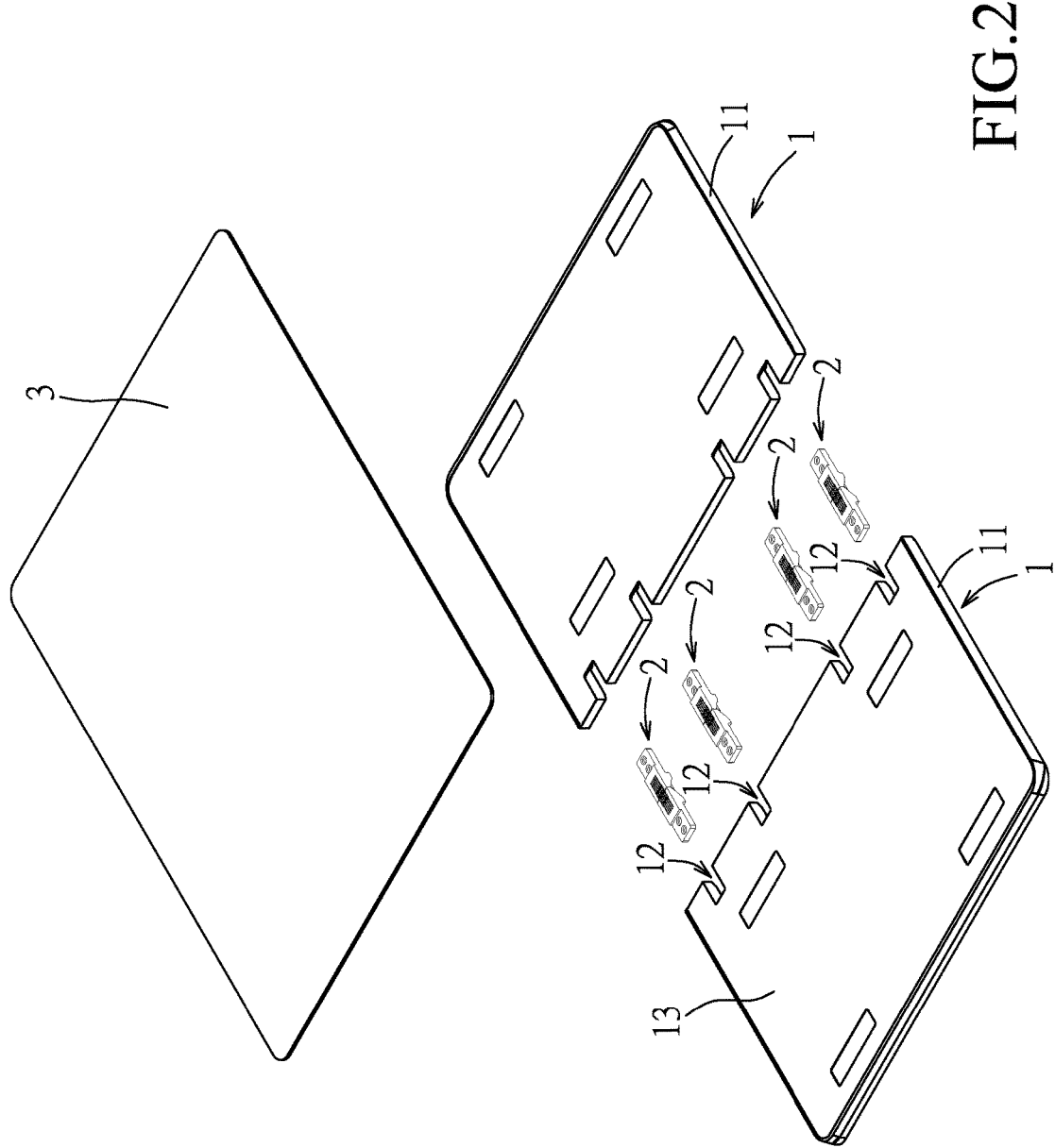
FIG. 2 is an exploded perspective view of the embodiment.
Figure 3:
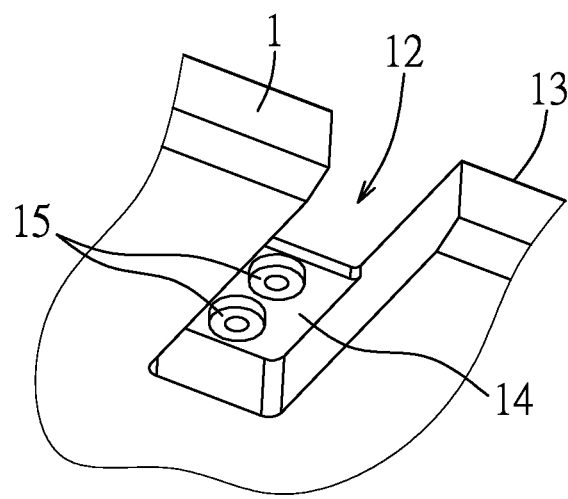
FIG. 3 is a fragmentary perspective view illustrating a portion of a casing half of the embodiment.

Referring to FIGS. 1 to 3, an embodiment of an electronic device according to the disclosure includes two casing halves 1, four multi-linkage hinges 2 and a flexible display sheet 3. In this embodiment, a foldable mobile phone is an example of the electronic device. In addition, the multi-linkage hinges 2 may be employed in a notebook PC to couple a first casing provided with a display portion and a second casing provided with a keyboard portion.

Each of the casing halves 1 has a casing body 11, four concaved portions 12 formed at the same side of the casing body 11 and spaced apart from one another, an attachment surface 13 to which the flexible display sheet 3 is attached, and four connecting surfaces 14 respectively formed in the concaved portions 12 and opposite to the attachment surface 13. Two fastener mounting projections 15 are disposed on each of the connecting surfaces 14.

Figure 4:
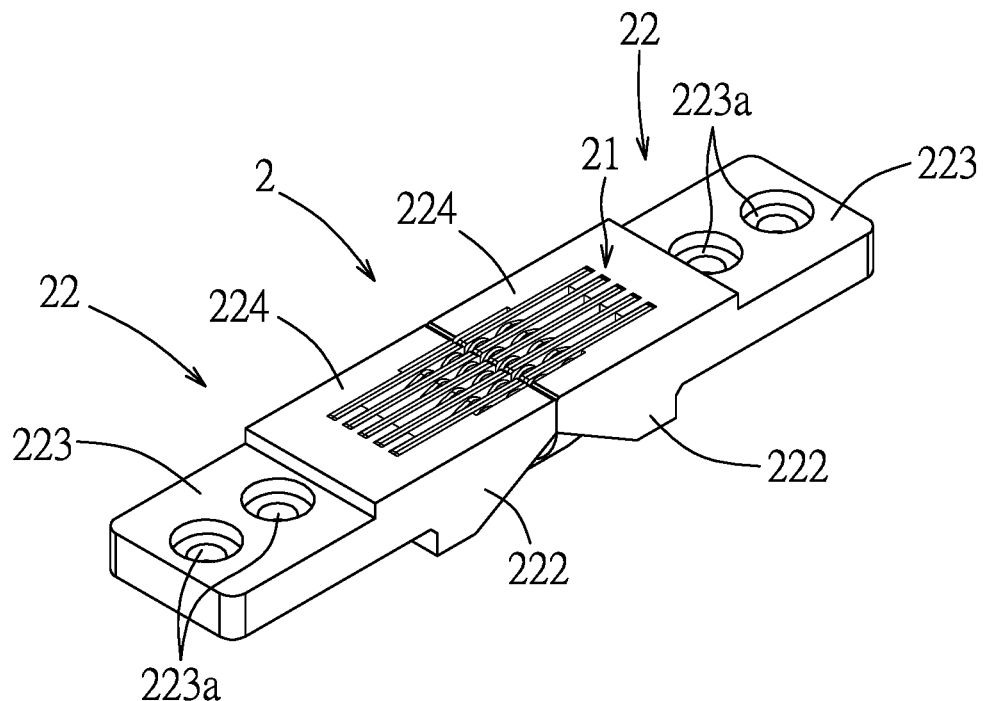
FIG. 4 is a perspective view illustrating a multi-linkage hinge of the embodiment.
Figure 5:
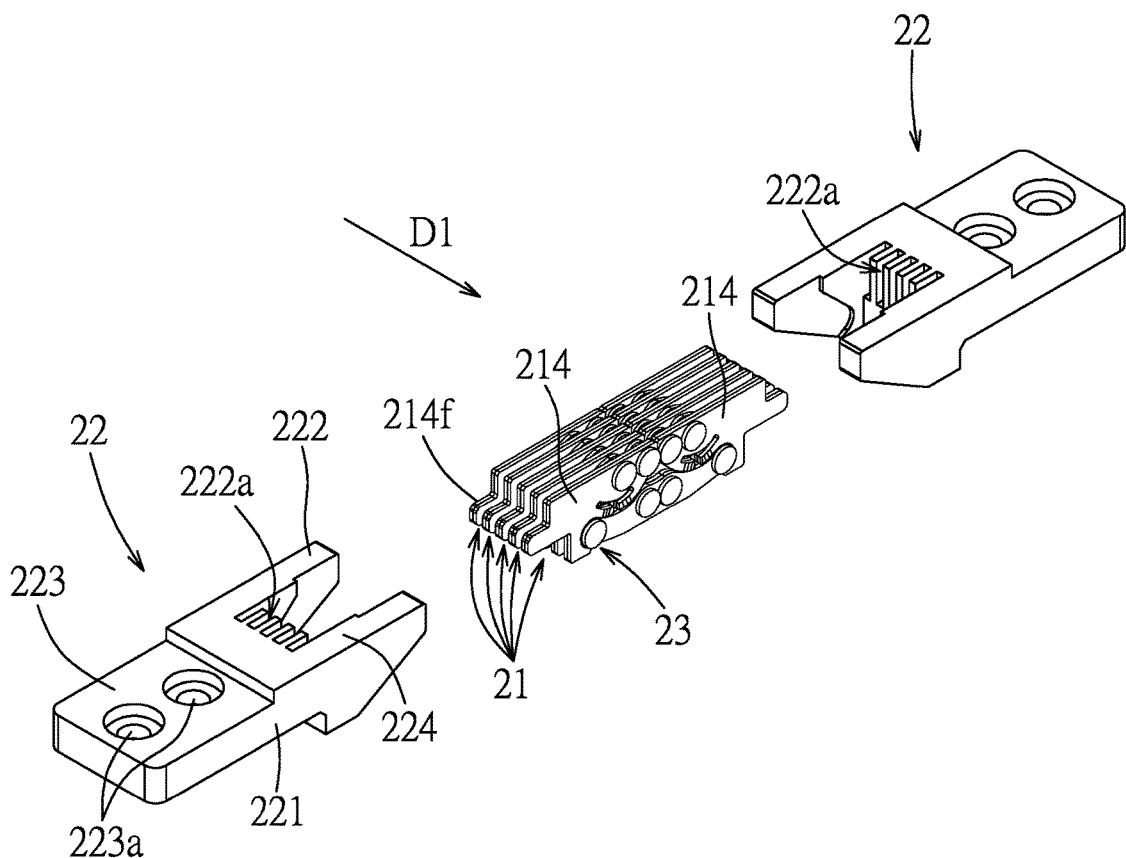
FIG. 5 is an exploded perspective view of the multi-linkage hinge.
Figure 6:
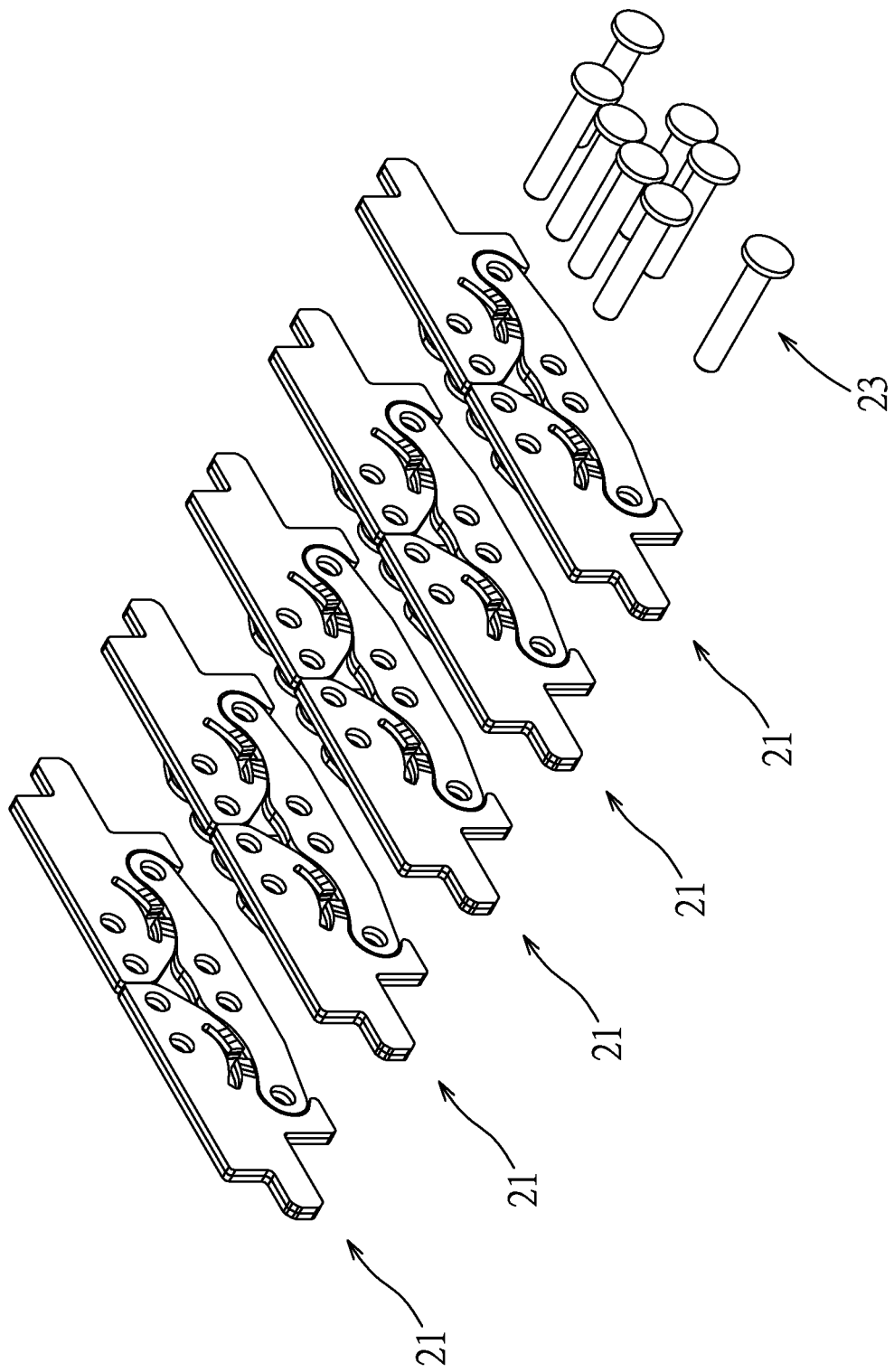
FIG. 6 is an exploded perspective view of a portion of the multi-linkage hinge.

With reference to FIGS. 4 to 6, each of the multi-leakage hinges 2 is disposed at the corresponding concaved portions 12 of the casing halves 1, and includes five linkage assemblies 21 aligned with each other in a first direction (D1), two coupling brackets 22 and eight pivot shafts 23.

Figure 7:
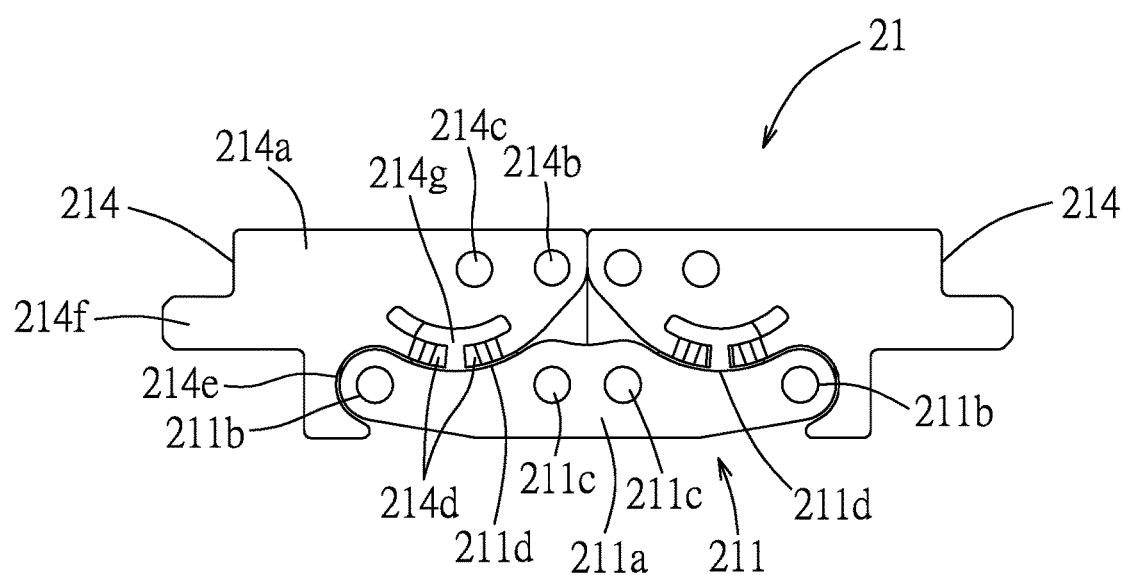
FIG. 7 is a schematic side view of the multi-linkage hinge, two friction bars and two synchronous rotation bars thereof being removed.
Figure 8:
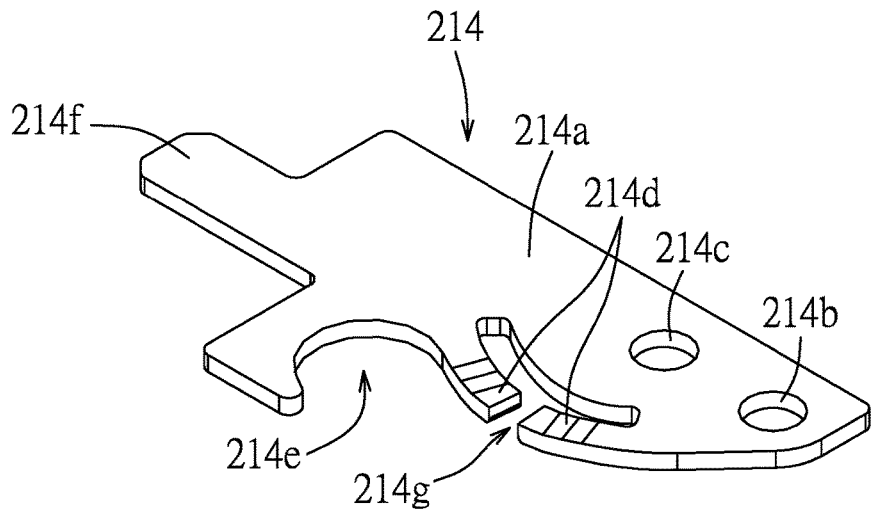
FIG. 8 is a perspective view illustrating a torsion plate of the multi-linkage hinge.
Figure 9:
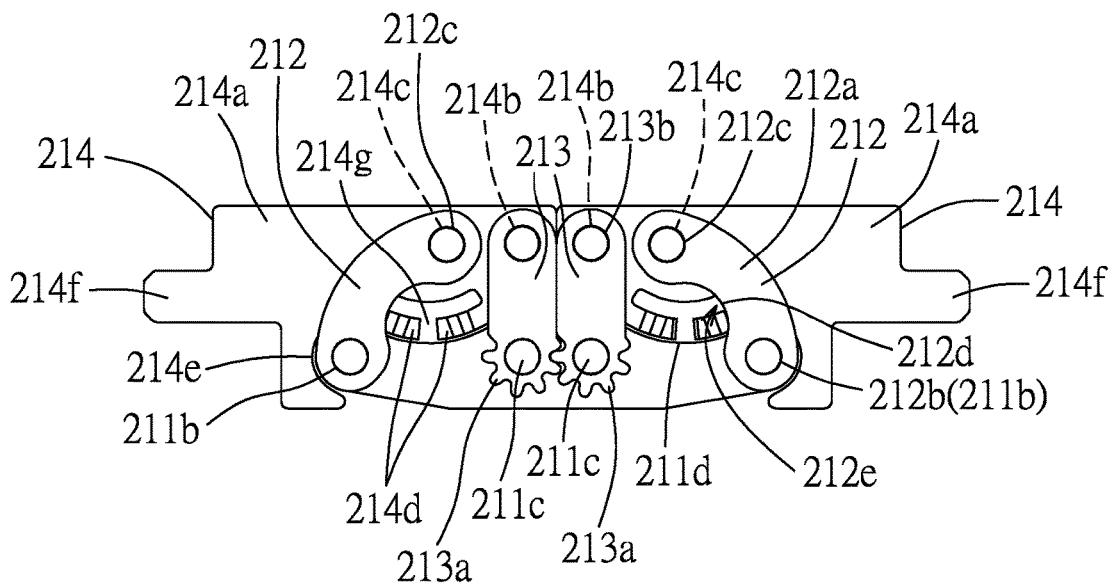
FIG. 9 is a schematic side view of two torsion plates and a base bar of the multi-linkage hinge, illustrating the two torsion plates in an unfolded position.

With reference to FIGS. 7 to 9, each linkage assembly 21 includes a base bar 211, two friction bars 212, two synchronous rotation bars 213 and two torsion plates 214. The base bar 211 has a crossbar (211*a*) which extends in a longitudinal direction to terminate at two connecting ends (211*b*) and which has two middle pivot portions (211*c*) that are disposed between the connecting ends (211*b*), and two lateral concaved portions (211*d*). Each of the two lateral concaved portions (211*d*) is formed between each of the middle pivot portions (211*c*) and a corresponding one of the connecting ends (211*b*). Each of the friction bars 212 has a bar body (212*a*) which has a first link end (212*b*) coupled to a respective one of the connecting ends (211*c*), a second link end (212*c*) opposite to the first link end (212*b*), and a lateral concaved portion (212*d*) disposed between the first and second link ends (212*b*, 212*c*). The synchronous rotation bars 213 are interposed between the friction bars 212. Each of the synchronous rotation bars 213 has a first pivot end (213*a*) which is pivotally coupled to a respective one of the middle pivot portions (211*c*), and a second pivot end (213*b*) opposite to the first pivot end (213*a*). The first pivot ends (213*a*) of the synchronous rotation bars have toothed rims meshing with each other so as to allow synchronous rotations of the second pivot ends (213*b*) in opposite directions. Each of the torsion plates 214 has a plate body (214*a*) having a driven end (214*b*) which is coupled to the second pivot end (213*b*) of the respective synchronous rotation bar 213, and a middle portion (214*c*) which is coupled to the second link end (212*c*) of the respective friction bar 212, a lateral projecting portion (214*d*) projecting from the plate body (214*a*) toward the respective friction bar 212, a retaining recessed portion (214*e*) adjoined with the lateral projecting portion (214*d*) and configured to match with the respective connecting end (211*b*) of the base bar 211, and a nose end (214*f*) disposed opposite to the driven end (214*b*). In particular, the lateral projecting portion (214*d*) has a cutout (214*g*). Moreover, each multi-linkage hinge 2 may further include an additional base bar 211 and two additional torsion plates 214 which are pivotally connected to the linkage assembly 21 by means of the pivot shafts 23.

With reference to FIGS. 3 to 5, each of the coupling brackets 22 has a bracket body 221 which has a connecting end portion 222 and a concaved end portion 223 opposite to each other in the longitudinal direction. The connecting end portion 222 has an upper major surface 224 and five insert grooves (222*a*) formed therein and aligned with one another in the first direction (D1) such that the nose end (214*f*) of the corresponding torsion plate 214 is securely engaged in the corresponding insert groove (222*a*) by a welding manner. The concaved end portion 223 is concaved from the upper major surface 224 to be inserted into the concaved portion 12. The concaved end portion 223 has two through holes (223*a*) aligned with the fastener mounting projections 15 to be securely mounted on the connecting surface 14 by means of fasteners (not shown).

Figure 10:
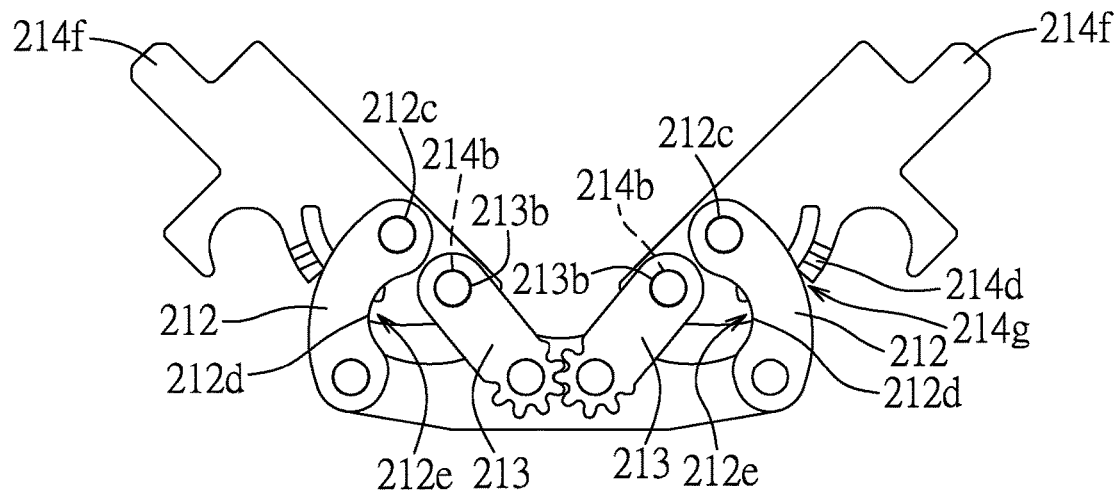
FIG. 10 illustrates how the torsion plates are turned from the unfolded position to a folded position.
Figure 11:
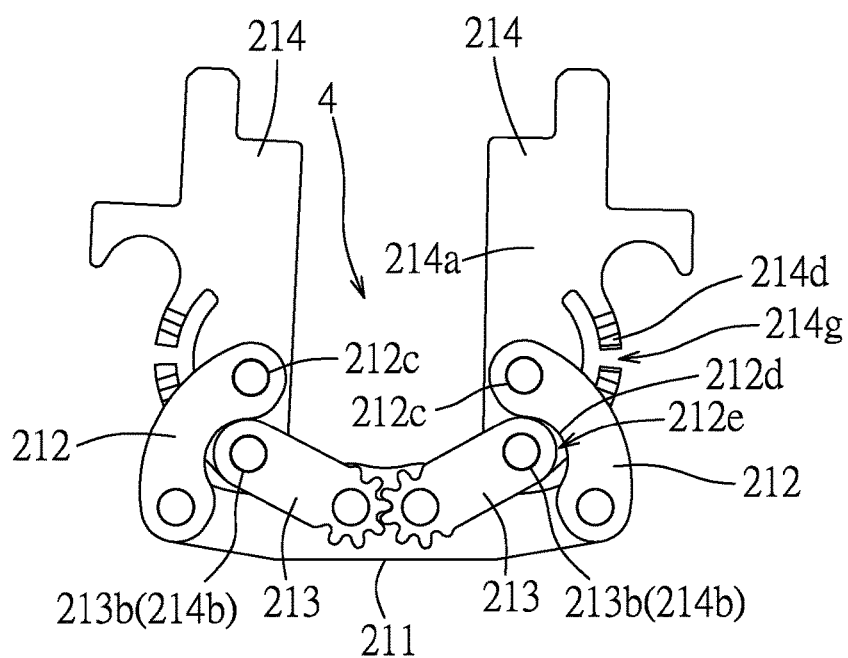
FIG. 11 illustrates the torsion plates in the folded position.

With reference to FIGS. 9 to 11, the torsion plates 214 are synchronously turnable with the synchronous rotations of the synchronous rotation bars 213 in the opposite directions, so that the casing halves 1, which are respectively connected with the torsion plates 214 via the coupling brackets 22 (see FIGS. 1 and 2) and which are coupled to each other via the multi-linkage hinges 2, can be opened and closed relative to each other. Specifically, the torsion plates 214 are synchronously turnable relative to the base bar 211, through a torque generated as a result of the synchronous rotations of the second pivot ends (213*b*) and linking of the second link end (212*c*) to the middle portion (214*c*), between an unfolded position (see FIG. 9) and a folded position (see FIG. 11). When the torsion plates 214 are in the unfolded position, the driven ends (214*b*) are aligned with and close to each other, the synchronous rotation bars 213 are parallel to each other and erected upright, the torsion plates 214 are parallel to the base bar 211 such that the retaining recessed portions (214*e*) are in mating engagement with the connecting ends (211*b*) of the base bars 211, and the lateral projecting portions (214*d*) of the torsion plates 214 are in mating engagement with the lateral concaved portions (211*d*) of the base bars 211 to have the lateral concaved portions (211*d*) in a frictional (pressed) engagement with the friction bars 212 with a first frictional force. In addition, as shown in FIGS. 1, 2 and 4, the connecting end portions 222 of the coupling brackets 22 are closer to each other and the upper major surfaces 224 are flush with the attachment surfaces 13 of the casing halves 1 so as to keep the flexible display sheet 3 in a flat state.

When it is desired to fold the electronic device, the torsion plates 214 are synchronously turned from the unfolded position to the folded position. During the synchronous turning, as shown in FIG. 10, the nose ends (214*f*) of the torsion plates 214 are moved closer to each other by means of the coupling brackets 22, and the driven ends (214*b*) are moved remote from each other to cause the rotation of the second pivot ends (213*b*) of the synchronous rotation bars 213 toward the corresponding friction bars 212. At the same time, the middle portions (214*c*) are moved to cause slightly upward and away from movement of the second link ends (212*c*) of the friction bars 212 for facilitating movement of the second pivot ends (213*b*) into concaved spaces (212*e*) defined by the lateral concaved portions (212*d*). Moreover, during the synchronous turning between the unfolded position and the folded position, the friction bars 212 are interfered (pressed) with the lateral projecting portions (214*d*) of the torsion plates 214 at the cutouts (214*g*) to generate a largest second frictional force (with a largest amount of deformation). That is, the second frictional force is larger than the first frictional force.

Figure 12:
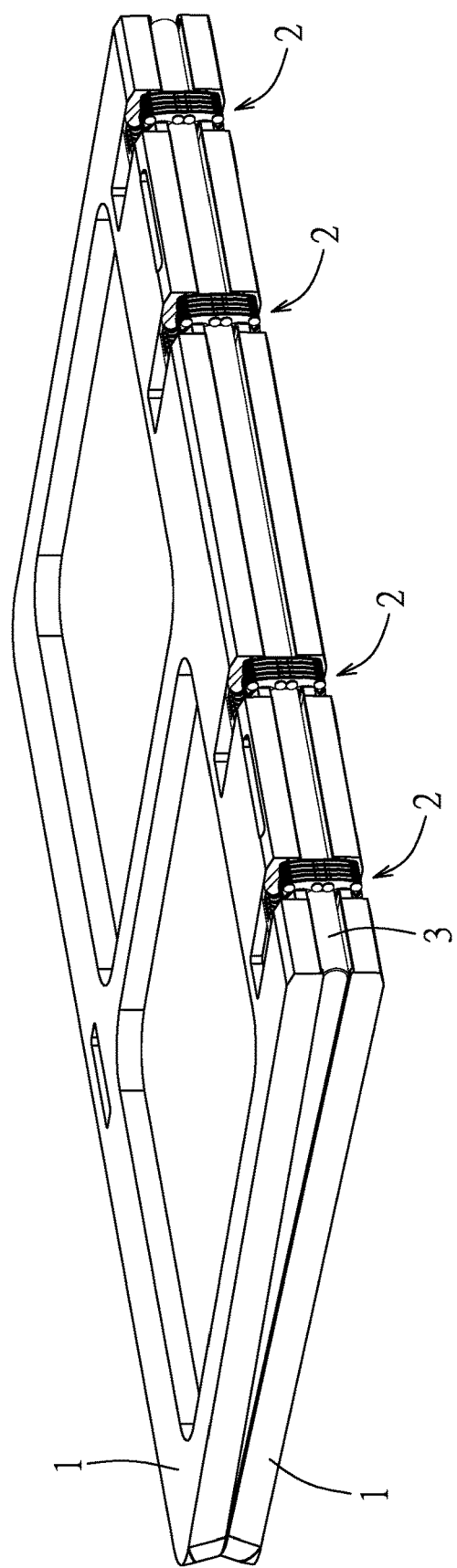
FIG. 12 is a perspective view of the electronic device of the embodiment, illustrating the state of two casing halves when the torsion plates are in the folded position.
Figure 13:
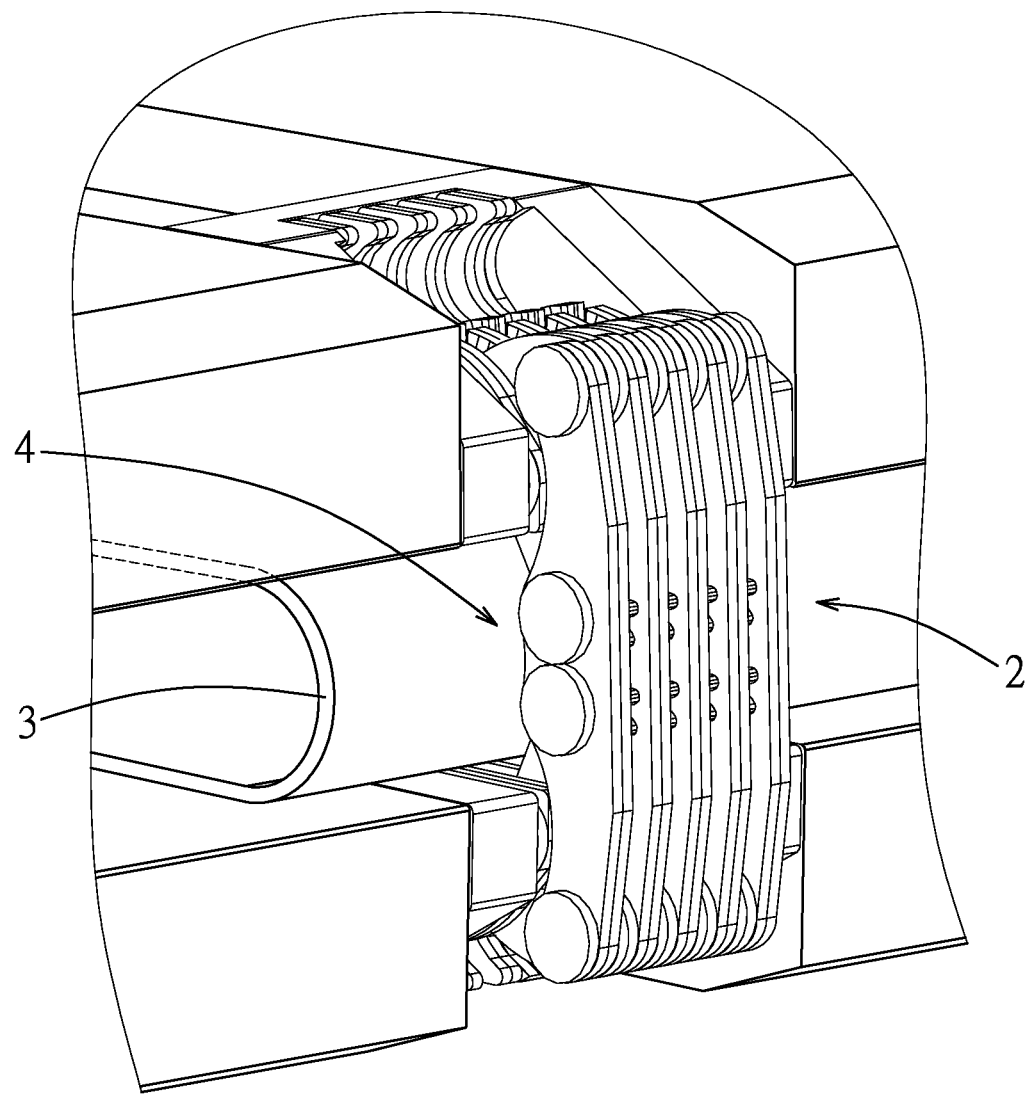
FIG. 13 is a fragmentary perspective view of FIG. 12, illustrating a bending portion of a flexible display sheet received in a bending space.

With reference to FIGS. 11 to 13, when the torsion plates 214 are in the folded position, the torsion plates 214 are transverse to the base bar 211, the driven ends (214*b*) are remote from each other to form a bending space 4 between the torsion plates 214, and the driven ends (214*b*) and the second pivot ends (213*b*) of the synchronous rotation bars 213 are received in the concaved spaces (212*e*). The friction bars 212 are interfered (pressed) with a part of the lateral projecting portions (214*d*) of the torsion plates 214 to generate therebetween a third frictional force that is smaller than the second frictional force. Therefore, the user can open and close the casing halves 1 with a less effort. The torsion plates 214 can be kept to a predetermined angular position with the frictional forces. In this embodiment, when the torsion plates 214 are in the folded position, the torsion plates 214 extend perpendicular to the base bar 211. Alternatively, they may be transverse to the base bar 211 by an included angle slightly more or less than 90 degrees to have the casing halves 1 be completely closed to each other. Moreover, the flexible display sheet 3 is attached to and covers the casing halves 1 and the multi-linkage hinges 2, and is bent when the torsion plates 214 are in the folded position, where a bending portion of the flexible display sheet 3 is received in the bending spaces 4. Thus, damage of the display sheet 3 is avoided.

As illustrated, with the synchronous rotation bars 213, the torsion plates 214 are turned synchronously to move the driven ends (214*b*) away from each other to form a bending space 4 between the torsion plates 214 for receiving the bending portion of the flexible display sheet 3. Moreover, with the different frictional forces generated between the torsion plates 214 and the friction bars 212, the user can open and close the casing halves 1 with a less effort.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multi-linkage hinge comprising:
   at least one linkage assembly including:
      a base bar having a crossbar which extends in a longitudinal direction to terminate at two connecting ends and which has two middle pivot portions that are disposed between said connecting ends;
      two friction bars, each having a first link end which is coupled to a respective one of said connecting ends, and a second link end opposite to said first link end;
      two synchronous rotation bars interposed between said friction bars, each of said synchronous rotation bars having a first pivot end which is coupled to a respective one of said middle pivot portions, and a second pivot end opposite to said first pivot end, said first pivot ends of said synchronous rotation bars meshing with each other so as to allow synchronous rotations of said second pivot ends in opposite directions; and
      two torsion plates, each having a driven end which is coupled to said second pivot end of a respective one of said synchronous rotation bars, and a middle portion which is coupled to said second link end of a respective one of said friction bars, said torsion plates being synchronously turnable relative to said base bar, through a torque generated as a result of the synchronous rotations of said second pivot ends and linking of said second link end to said middle portion, between an unfolded position, where said driven ends are close to each other, and a folded position, where said driven ends are remote from each other to form a bending space between said torsion plates, said torsion plates being configured to respectively interfere with said friction bars with a friction force that keeps said torsion plates to a predetermined angular position during the synchronous turning of said torsion plates.

2. The multi-linkage hinge as claimed in Claim 1, wherein each of said friction bars has a bar body having said first and second link ends at two opposite ends, and a lateral concaved portion disposed between said first and second link ends, said second link ends of said friction bars being moved away from each other during the synchronous turning of said torsion plates to either one of the unfolded and folded positions to allow movement of said second pivot ends of said synchronous rotation bars into or away from said lateral concaved portions, respectively.

3. The multi-linkage hinge as claimed in Claim 1, wherein each of said torsion plates has a plate body having said driven end and said middle portion, and a lateral projecting portion which projects from said plate body toward a respective one of said friction bars and which is in a frictional engagement with said respective friction bar during the synchronous turning of said torsion plates between the unfolded and folded positions.

4. The multi-linkage hinge as claimed in claim 3, wherein said lateral projecting portion of each of said torsion plates is configured to be in frictional engagement with said respective friction bar with first and third frictional forces when said torsion plates are in the unfolded and folded positions, respectively, and with a second frictional force when said torsion plates are in other angular positions between the unfolded and folded positions, wherein each of the first and third frictional forces is smaller than the second frictional force.

5. The multi-linkage hinge as claimed in claim 3, wherein each of said torsion plates has a retaining recessed portion which is adjoined with said lateral projecting portion and which is configured to allow mating engagement with the respective one of said connecting ends of said base bar when said torsion plates are in the unfolded position.

6. The multi-linkage hinge as claimed in claim 3, further comprising two coupling brackets, each disposed to couple a respective one of said torsion plates to a casing half such that the casing halves are coupled to each other via said multi-linkage hinge to be opened and closed relative to each other.

7. The multi-linkage hinge as claimed in Claim 6, wherein each of said coupling brackets has a bracket body which has a connecting end portion and a concaved end portion opposite to each other in the longitudinal direction, each of said torsion plates being connected to said connecting end portion.

8. The multi-linkage hinge as claimed in Claim 7, wherein said connecting end portion of each of said coupling brackets has at least one insert groove, each of said torsion plates having a nose end disposed opposite to said driven end and securely engaged in said insert groove.

9. An electronic device comprising:
   a plurality of multi-linkage hinges as claimed in claim 1, each of said multi-linkage hinges further comprising two coupling brackets, each of which is connected to a respective one of said torsion plates of said at least one linkage assembly;
   two casing halves respectively connected with said coupling brackets such that said casing halves are coupled to each other via said multi-linkage hinges to be opened and closed relative to each other; and
   a flexible display sheet attached to and covering said casing halves and said multi-linkage hinges,
   wherein said flexible display sheet is bent when said torsion plates are in the folded position, where a bending portion of said flexible display sheet is received in said bending spaces.

10. The electronic device as claimed in claim 9, wherein each of said casing halves has an attachment surface to which said flexible display sheet is attached, and a connecting surface opposite to said attachment surface, each of said coupling brackets having a bracket body which has a connecting end portion and a concaved end portion opposite to each other in the longitudinal direction, each of said torsion plates being connected to said connecting end portion, said connecting surface being mounted on said concaved end portion.

11. The electronic device as claimed in claim 10, wherein said connecting end portion of each of said coupling brackets has at least one insert groove, each of said torsion plates having a nose end disposed opposite to said driven end and securely engaged in said insert groove.

12. The electronic device as claimed in claim 9, wherein each of said friction bars has a bar body having said first and second link ends at two opposite ends, and a lateral concaved portion disposed between said first and second link ends, said second link ends of said friction bars being moved away from each other during the synchronous turning of said torsion plates to either one of the unfolded and folded positions to allow movement of said second pivot ends of said synchronous rotation bars into or away from said lateral concaved portions, respectively.

13. The electronic device as claimed in claim 9, wherein each of said torsion plates has a plate body having said driven end and said middle portion, and a lateral projecting portion which projects from said plate body toward a respective one of said friction bars and which is in a frictional engagement with said respective friction bar during the synchronous turning of said torsion plates between the unfolded and folded positions.

14. The electronic device as claimed in claim 13, wherein said lateral projecting portion of each of said torsion plates is configured to be in frictional engagement with said respective friction bar with first and third frictional forces when said torsion plates are in the unfolded and folded positions, respectively, and with a second frictional force when said torsion plates are in other angular positions between the unfolded and folded positions, wherein each of the first and third frictional forces is smaller than the second frictional force.

15. The electronic device as claimed in claim 13, wherein each of said torsion plates has a retaining recessed portion which is adjoined with said lateral projecting portion and which is configured to allow mating engagement with the respective one of said connecting ends of said base bar when said torsion plates are in the unfolded position.

* * * * *